US012278924B2

(12) United States Patent
Choi

(10) Patent No.: US 12,278,924 B2
(45) Date of Patent: Apr. 15, 2025

(54) MOBILE DEVICE INCLUDING AUTOMATIC RESPONSE FUNCTION, AUTOMATIC RESPONSE METHOD OF MOBILE DEVICE, AND COMPUTER PROGRAM THEREFOR

(71) Applicant: ICubeOn Inc., Seoul (KR)

(72) Inventor: Seungjin Choi, Seoul (KR)

(73) Assignee: ICubeOn Inc., Seoul (KR)

( * ) Notice: Subject to any disclaimer, the term of this patent is extended or adjusted under 35 U.S.C. 154(b) by 432 days.

(21) Appl. No.: 17/920,284

(22) PCT Filed: Nov. 16, 2021

(86) PCT No.: PCT/KR2021/016683
§ 371 (c)(1),
(2) Date: Oct. 20, 2022

(87) PCT Pub. No.: WO2022/114637
PCT Pub. Date: Jun. 2, 2022

(65) Prior Publication Data
US 2023/0199115 A1    Jun. 22, 2023

(30) Foreign Application Priority Data
Nov. 26, 2020  (KR) ........................ 10-2020-0160941

(51) Int. Cl.
*H04M 3/487*   (2006.01)
*H04M 1/72484* (2021.01)
*H04W 4/16*    (2009.01)

(52) U.S. Cl.
CPC ..... *H04M 3/4872* (2013.01); *H04M 1/72484* (2021.01); *H04W 4/16* (2013.01)

(58) Field of Classification Search
CPC ........... H04M 3/4872; H04M 3/53366; H04M 3/53308; H04M 3/53391; H04M 1/72484;
(Continued)

(56) References Cited

FOREIGN PATENT DOCUMENTS

| JP | 2015-226079 | 12/2015 |
|----|-------------|---------|
| KR | 10-0936757  | 1/2015  |

(Continued)

OTHER PUBLICATIONS

International Search Report and Written Opinion in International Appln. No, PCT/KR2021/016683, mailed on Mar. 2, 2022, 10 pages.
(Continued)

*Primary Examiner* — Farid Seyedvosoghi
(74) *Attorney, Agent, or Firm* — ZION IP; Byungwoong Park

(57) ABSTRACT

A mobile device according to an embodiment of the present disclosure includes a processor; a call module which operates by control of the processor and is configured to receive an incoming call; a service module which operates by control of the processor and is configured to automatically connect the incoming call when an automatic call response service is set in the mobile device; and an interworking module which operates by control of the processor and is configured to perform a preset function of the mobile device in response to a request from the service module after the incoming call is connected by the service module. Using the mobile device, it is possible that the mobile device automatically receives the incoming call without a user's intervention according to the setting.

13 Claims, 5 Drawing Sheets

(58) Field of Classification Search
CPC ...... H04M 1/642; H04M 1/64; H04M 1/6505; H04M 2203/253; H04M 2250/60; H04W 4/16; H04W 88/02
See application file for complete search history.

(56) References Cited

FOREIGN PATENT DOCUMENTS

| KR | 10-1612109 | | 4/2016 |
| KR | 10-2017-0032758 | | 3/2017 |
| KR | 10-2018-0078549 | | 7/2018 |
| KR | 20180078549 A | * | 7/2018 |
| KR | 10-2018-0112349 | | 10/2018 |
| KR | 20180112349 A | * | 10/2018 |
| WO | WO 2015041449 A1 | | 3/2015 |

OTHER PUBLICATIONS

International Preliminary Report on Patentability in International Appln. No. PCT/KR2021/016683, mailed on Jun. 8, 2023, 13 pages (with English translation).

* cited by examiner

MOBILE DEVICE INCLUDING AUTOMATIC RESPONSE FUNCTION, AUTOMATIC RESPONSE METHOD OF MOBILE DEVICE, AND COMPUTER PROGRAM THEREFOR

CROSS-REFERENCE TO RELATED APPLICATIONS

This application is a National Stage application under 35 U.S.C. § 371 of International Application No. PCT/KR2021/016683, having an International Filing Date of Nov. 16, 2021, which claims priority to Korean Patent Application No. 10-2020-0160941 having an International Filing Date of Nov. 26, 2020.

The disclosure of the prior applications are considered part of the disclosure of this application, and are incorporated by reference in their entirety into this application.

TECHNICAL FIELD

Embodiments relate to a mobile device, an automatic call response method of the mobile device and a computer program therefor. More particularly, embodiments relate to technology that implements an automatic call response service using a mobile device by enabling the mobile device to automatically receive an incoming call and play audio and/or transmit connection information via a Uniform Resource Locator (URL) to a caller terminal of the call.

BACKGROUND ART

An automatic call response service (also referred to as an ARS service) is a service that provides a user with information in the form of a voice signal. The automatic call response service is configured to provide information in the form of a voice signal according to a preset scenario, and provide information requested from the user as a voice signal while moving the scenario (menu) according to an input Dual Tone Multi Frequency (DTMF) signal from the user's telephone terminal.

Recently, technology that provides a visual automatic call response service by providing a voice-based automatic call response service and a User Interface (UI) display together has been developed. In the case of the visual automatic call response service, the user can move the menu while seeing the display corresponding to the guidance comments, so the user does not need to memorize the content of the guidance comments or each menu item.

To provide the visual automatic call response service, a voice response server for providing an automatic response in the form of a voice signal is necessary, and apart from this, a server for providing visual information to the user terminal are required. One of the conventional technology, for example, Korean Patent No. 10-1612109 discloses "a system and method for providing a visual ARS service" in which the visual ARS providing system is double-connected to the user's mobile terminal via a communication network and a network that are independent of each other.

However, it takes a lot of time and costs to build the dual automatic call response service system, and accordingly people who run small businesses, not large companies, have difficulties in providing the visual automatic call response service to customers.

RELATED LITERATURES

Patent Literature (Patent Literature 1) Korean Patent No. 10-1612109

DISCLOSURE

Technical Problem

According to an aspect of the present disclosure, there are provided a mobile device for implementing an automatic call response service by enabling the mobile device to automatically receive an incoming call and play audio and/or transmit connection information via a Uniform Resource Locator (URL) to a caller terminal of the call, and an automatic call response method of the mobile device and a computer program therefor.

Technical Solution

A mobile device according to an embodiment of the present disclosure includes a processor; a call module which operates by control of the processor and is configured to receive an incoming call; a service module which operates by control of the processor and is configured to automatically connect the incoming call when an automatic call response service is set in the mobile device; and an interworking module which operates by control of the processor and is configured to perform a preset function of the mobile device in response to a request from the service module after the incoming call is connected by the service module.

In an embodiment, the service module includes a transaction service unit configured to store information about whether the automatic call response service is set and transmit information corresponding to the incoming call; and a call service unit configured to selectively connect the incoming call based on the information about whether the automatic call response service is set.

In an embodiment, the service module further includes a log service unit configured to store information about at least one of a calling number, a connection time or a call duration of the incoming call connected by the call service unit.

In an embodiment, the service module is further configured to transmit an audio control command to the interworking module in response to the connection of the incoming call, and the interworking module is further configured to stop an operation of a speaker and a microphone of the mobile device and transmit an audio control request for control of audio playing by the mobile device to the call module in response to the audio control command.

In an embodiment, the service module is further configured to disconnect the connection of the incoming call in response of the call module terminating the audio playing based on the audio control command.

In an embodiment, the service module is further configured to transmit a guidance message including a Uniform Resource Locator (URL) to a caller terminal of the incoming call via push notification through an application or a text message after the incoming call is connected.

The mobile device according to an embodiment further includes an input module which operates by control of the processor and is configured to receive a user input about whether to execute the automatic call response service. In this instance, the interworking module is further configured to stop the execution of the preset function in response to the input module receiving a user input for stop of the automatic call response service.

An automatic call response method of a mobile device according to an embodiment is performed by the mobile device including a processor, a call module, a service module and an interworking module, and includes receiving, by the call module, an incoming call; automatically connecting, by the service module, the received incoming call when an automatic call response service is set in the mobile device; transmitting, by the service module, a request for execution of a preset function of the mobile device to the interworking module after the incoming call is connected; and performing, by the interworking module, the preset function on the mobile device in response to the request from the service module.

In an embodiment, the service module is configured to store information about whether the automatic call response service is set in the mobile device. Additionally, in this instance, the automatic call response method of the mobile device further includes, before automatically connecting the incoming call, inspecting, by the service module, whether the automatic call response service is set in the mobile device.

The automatic call response method of the mobile device according to an embodiment further includes, after automatically connecting the incoming call, storing, by the service module, information about at least one of a calling number, a connection time or a call duration of the incoming call.

In an embodiment, the request for the execution of the preset function includes an audio control request. In this instance, the step of performing the preset function on the mobile device includes stopping, by the interworking module, an operation of a speaker and a microphone of the mobile device in response to the audio control command; and transmitting, by the interworking module, an audio control request for control of audio playing by the mobile device to the call module in response to the audio control command.

The automatic call response method of the mobile device according to an embodiment further includes disconnecting, by the service module, the connection of the incoming call in response to the call module terminating the audio playing based on the audio control command.

The automatic call response method of the mobile device according to an embodiment further includes transmitting, by the service module, a guidance message including a URL to a caller terminal of the incoming call via push notification through an application or a text message after the incoming call is connected.

The automatic call response method of the mobile device according to an embodiment further includes receiving a user input for stop of the automatic call response service through an input module of the mobile device; and stopping, by the interworking module, the execution of the preset function in response to the input module receiving the user input for the stop of the automatic call response service.

A computer program according to an embodiment may be stored in a computer-readable medium to perform the automatic call response method of the mobile device according to the above-described embodiments in combination with hardware.

Advantageous Effects

In accordance with the mobile device according to an aspect of the present disclosure and its automatic call response method, according to the automatic call response service (also referred to as the ARS service) set in the mobile device, the mobile device automatically receives an incoming call without the user's intervention and provides the ARS service to a caller by playing a preset audio and/or transmitting connection information via a Uniform Resource Locator (URL).

Using the mobile device according to an aspect of the present disclosure and its automatic call response method, it is possible to provide a visual ARS service that combines voice guidance with display at a very low cost through the individual's mobile device without needing to build a voice call center system and a visual ARS server system that require a lot of costs.

Additionally, in accordance with the mobile device according to an aspect of the present disclosure and its automatic call response method, the mobile device is configured to automatically terminate the call connection after providing necessary information to the caller through automatic call reception, thereby preventing the called number from being continuously busy when providing the ARS service using the mobile device, and accordingly it is possible to continuously provide the service to multiple callers through one mobile device.

BEST MODE

Hereinafter, embodiments of the present disclosure will be described in detail with reference to the accompanying drawings.

Figure 1:
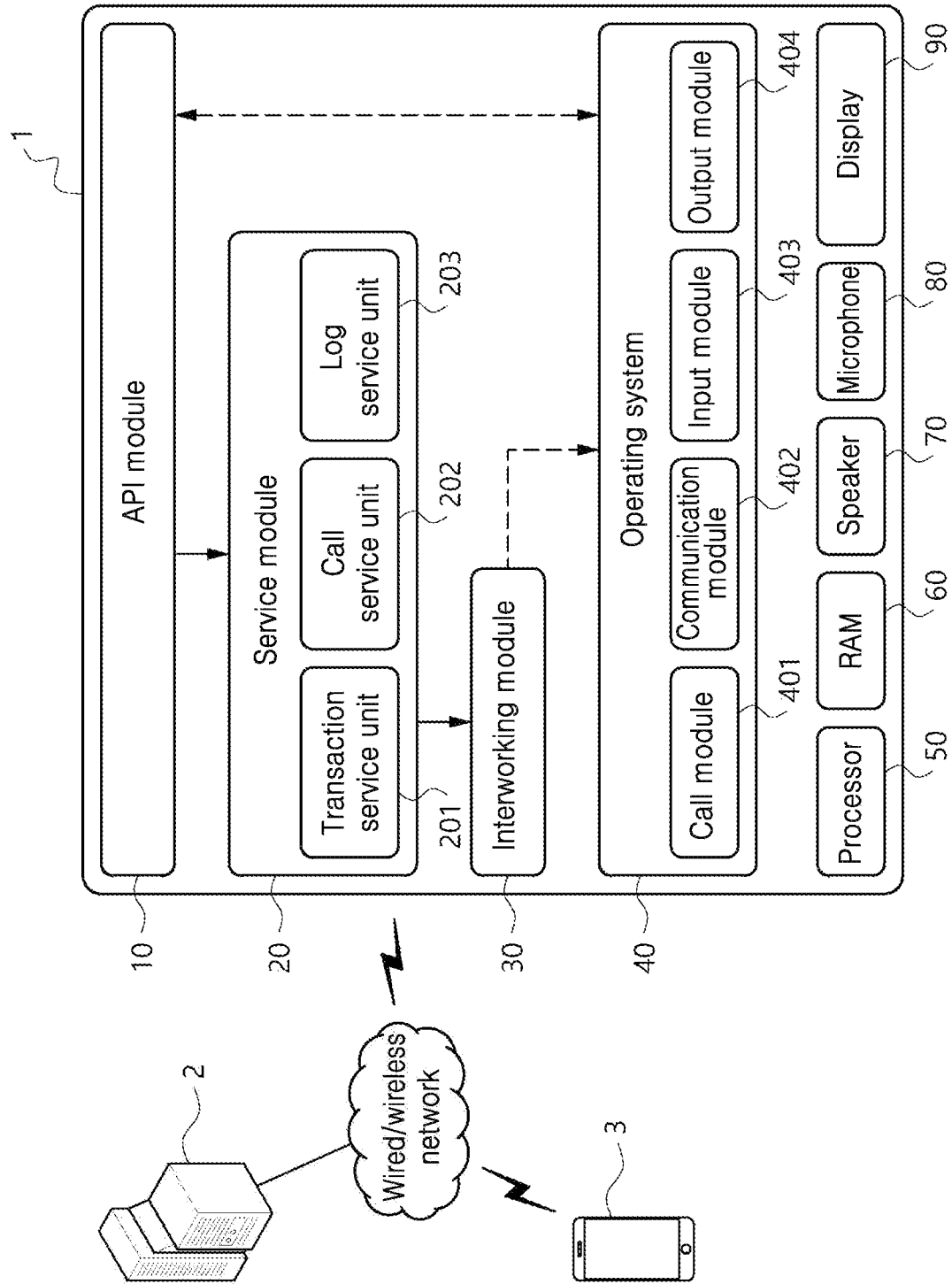
FIG. 1 is a schematic block diagram showing a configuration of a mobile device according to an embodiment.

FIG. 1 is a schematic block diagram showing a configuration of a mobile device according to an embodiment.

Referring to FIG. 1, the mobile device 1 according to this embodiment is configured to receive an incoming call from a caller terminal 3 via a communication network, and provide an automatic call response service (also referred to as an ARS service) to the caller. For example, the user who uses the mobile device 1 may be a businessman who provides products or services to customers, and the caller who uses the caller terminal 3 may be a potential customer who called the telephone number of the corresponding businessman.

In the specification, the mobile device 1 is described by taking a smartphone as an example. However, the mobile device 1 is a user device that is different from a call center system built using a separate equipment or server, and refers to any device capable of responding to a communication call or a data call. The mobile device 1 is not limited to the smartphone, and another mobile communication terminal, a wired telephone with an information processing function or any other type of user device may correspond to the mobile device 1 described herein.

In an embodiment, the mobile device 1 may be configured to operate in further communication with an external server 2 such as a database (DB) server to store automatic call response records or search for user history.

In the specification, the incoming call refers to a call coming in the mobile device 1 from another mobile phone such as the caller terminal 3, and may be a voice call, a data call or a video call. The method for communication between the mobile device 1 according to embodiments and the caller terminal 3 and communication between the mobile device 1 according to embodiments and the external server 2 may include any communication method for networking between objects via a wired and/or wireless network, and is not limited to wired communication, wireless communication, 3G, 4G, 5G or other methods.

For example, the mobile device 1 according to embodiments may carry out communication by at least one communication method selected from the group consisting of Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), Wi-MAX (World Interoperability for Microwave Access) and communication using ultrasonic waves, but is not limited thereto.

Each module or unit of the mobile device 1 according to embodiments may have aspects of entirely hardware, or partly hardware and partly software. For example, each module or unit of the mobile device 1 shown in FIG. 1 may refer collectively to hardware for processing data of a specific format and content and/or transmitting and receiving the data by an electronic communication method and its related software. The term "unit", "module", "device", "terminal", "server" or "system" as used herein is intended to refer to a combination of hardware and software that runs on the corresponding hardware. For example, the software that runs on the hardware may refer to a process being executed, an object, an executable, a thread of execution and a program.

Additionally, each component of the mobile device 1 is not necessarily intended to refer to a separate device that is physically separated from each other. For example, each module that belongs to an Application Programming Interface (API) module 10, a service module 20, an interworking module 30 and an Operating System (OS) 40 of FIG. 1 is functionally classified according to the operations performed by the hardware of the mobile device 1, and each unit does not need to be independent of each other.

The mobile device 1 may include, as its hardware, a processor 50, Random Access Memory (RAM) 60, a speaker 70, a microphone 80 and a display 90. Additionally, each function module 10, 20, 30 and the OS 40 of the mobile device 1 may be implemented using at least some of the hardware. In the specification, the processor 50 of the mobile device 1 may refer to an Application Processor (AP) where a Central Processing Unit (CPU), a graphics card, a communication modem and a storage device are combined in a single chip like a System on Chip (SoC), but is not limited thereto, and each function unit may be separated from each other.

The OS 40 refers to a software means that manages the hardware resources of the mobile device 1 and provides an environment for the use of the mobile device 1. In the specification, the OS 40 of the mobile device 1 is described by taking Google's smartphone OS, Android, as an example. However, the OS for the operation of the mobile device 1 according to embodiments is not limited to Android, and any known or future OS may correspond to the OS 40 of the present disclosure.

The OS 40 may include at least one function module such as a call module 401 for call reception and transmission, a communication module 402 for data communication, an input module 403 for receiving a user input and an output module 404 for outputting information in the form of sound and/or display, and each function module may operate using all or some of the hardware of the mobile device 1 such as the processor 50, the RAM 60, the speaker 70, the microphone 80 or the display 90.

The API module 10, the service module 20 and the interworking module 30 of the mobile device 1 according to this embodiment are operated by the hardware of the mobile device 1 including the processor 50. The API module 10 operates with an application pre-installed in the mobile device 1, and functions to receive a user input about whether to execute the automatic call response service through the mobile device 1 and store the corresponding setting and parameters for the execution of the automatic call response service in the application.

When the execution of the automatic call response service through the mobile device 1 is set, the service module 20 is configured to automatically connect the incoming call received through the call module 401. After the incoming call is connected, the service module 20 is configured to request the interworking module 30 to perform the necessary function for the automatic call response service. In response to the request received from the service module 20, the interworking module 30 may request the specific modules 401-404 that belong to the OS 40 of the mobile device 1 to perform the preset function to implement the automatic call response service through the mobile device 1.

For the above operation, in an embodiment, the service module 20 includes a transaction service unit 201 and a call service unit 202. The transaction service unit 201 may store the information about whether the automatic call response service through the mobile device 1 is set in association with the preset application installed in the mobile device 1. Additionally, the transaction service unit 201 may transmit information corresponding to the incoming call received through the call module 401 of the OS 40 to the call service unit 202.

The call service unit 202 may selectively connect the incoming call received through the call module 401 based on whether the automatic call response service is set in the mobile device 1. That is, in case that the automatic call response service is set in the mobile device 1, the call service unit 202 puts the phone off-hook by connecting the incoming call. Additionally, the call service unit 202 may perform the function of transmitting a text message to the caller terminal 3. After the incoming call is connected, the call service unit 202 may request the interworking module 30 to perform the preset function (for example, playing audio) for the automatic call response service, and in response to the request, the interworking module 30 may control the necessary function module of the OS 40.

In contrast, in case that the automatic call response service is not set in the mobile device 1, the call service unit 202 does not perform the above-described operation, and the ordinary incoming call reception and response process through the OS 40 is performed.

In an embodiment, the service module 20 further includes a log service unit 203. The log service unit 203 is configured to generate and store an automatic call response history through the mobile device 1, and for example, the calling number, the connection time and/or the call duration of the incoming call connected by the call service unit 202 may be stored as the automatic call response history. The log service 203 may be configured to store the automatic call response history in a local storage within the mobile device 1 or may be configured to store the automatic call response history in the external server 2 via the wired and/or wireless network.

Figure 2:
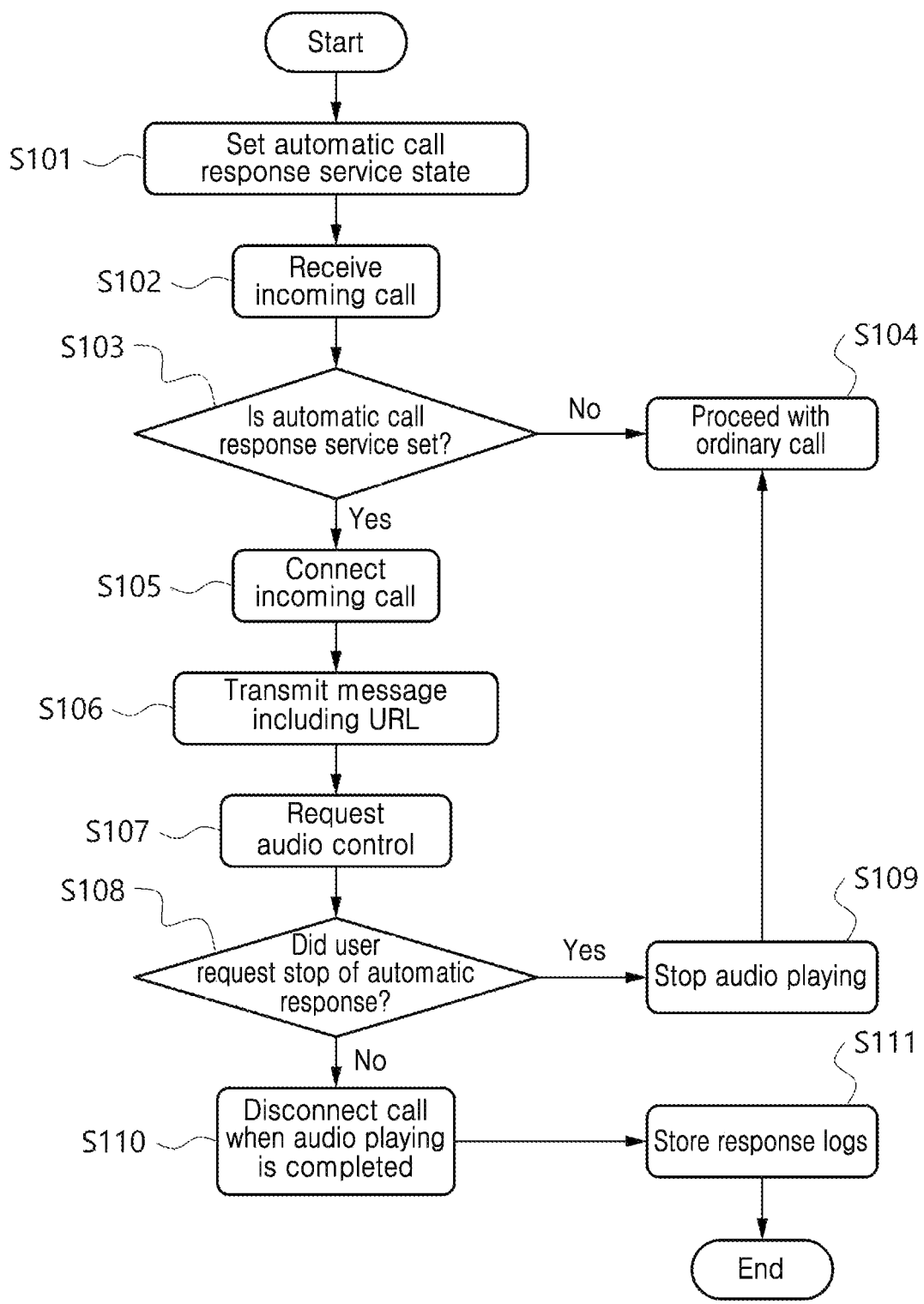
FIG. 2 is a flowchart showing each step of an automatic call response method of a mobile device according to an embodiment.

FIG. 2 is a flowchart showing each step of an automatic call response method of the mobile device according to an embodiment. For convenience of description, the automatic call response method of the mobile device according to this embodiment will be described with reference to FIGS. 1 and 2.

To begin with, the user of the mobile device 1 may set the state as to whether to use the automatic call response service using the mobile device 1 (S101). To this end, the software application (or app) for the execution of the automatic call response service may be pre-installed in the mobile device 1, and the user may set whether to use the automatic call response service through the corresponding application and the related function parameters through the API module 10.

The mobile device 1 having the installed application for the automatic call response service may create an intent for the service module 20 to process the incoming call to the mobile device 1, and the corresponding intent may be executed using the parameters related to the functions that will be performed when automatically responding to the incoming call, for example, ON or OFF related parameters of the automatic call response service and parameters related to audio routing to be controlled when automatically responding to the incoming call. When the use of the automatic call response service is set, library corresponding to the service module 20 is executed to run a transaction service and a call service for the response to the incoming call on the mobile device 1 by the transaction service unit 201 and the call service unit 202, respectively.

In this state, when the incoming call from the caller terminal 3 is received (S102), the transaction service unit 201 determines whether the use of the automatic call response service is set (S103), and the call service unit 202 set to use the automatic call response service puts the phone off-hook by connecting the incoming call (S105). In case that the non-use of the automatic call response service is set, the operation by the call service unit 202 is not performed and the ordinary call response through the call module 401 of the OS 40 is made to the incoming call (S104).

In an embodiment, the automatic call response service related parameters may include information about a preset location to execute the automatic call response service or not to execute the automatic call response service. In this embodiment, when the incoming call is received, the service module 20 may acquire location information of the mobile device 1 from the OS of the mobile device 1 through the interworking module 30, and determine whether to use the automatic call response service by comparing the location of the mobile device 1 with the preset location. For example, in case that the location of the mobile device 1 is the preset location to execute the automatic call response service, the call service unit 202 may connect the incoming call, and in case that the location of the mobile device 1 is any other location, may make the ordinary call response. Alternatively, in case that the location of the mobile device 1 is the preset location not to execute the automatic call response service, the ordinary call response may be made, and in case that the location of the mobile device 1 is any other location, the incoming call connection by the call service unit 202 may be made.

In this embodiment, the user who wants to provide the automatic call response service using the mobile device 1 may be, for example, a businessman who owns a business place, and the businessman may desire to respond to customers' calls in person without needing to use the automatic call response service when he/she is located in the business place, and respond to customers' calls through the automatic call response service when he/she is not located in the business place. In this case, the user may set, as the automatic call response service related parameters, the location of his/her business place to be the location in which the automatic call response service is not executed.

When the incoming call is coming, the service module 20 may detect whether the mobile device 1 is currently located within a predetermined distance from the business place through the interworking with the OS of the mobile device 1, and when the mobile device 1 is located near the business place, may make the ordinary call response. On the contrary, when the mobile device 1 is not located near the business place, the call service unit 202 may put the phone off-hook by connecting the incoming call to provide the automatic call response service as described below.

In another embodiment, the automatic call response service related parameters may be used to determine whether to execute the automatic call response service in association with any other state information than the location of the mobile device 1, for example, the receive mode of the mobile device 1 among the following modes: a silent mode, a vibrate mode and a ring mode.

When the incoming call is received, the service module 20 may identify the receive mode information of the mobile device 1 from the OS of the mobile device 1 through the interworking module 30, and in case that the receive mode is a preset mode to execute the automatic call response service, the call service unit 202 may connect the incoming call, and in case that the mobile device 1 is set to the other receive mode, may make the ordinary call response. For example, in case that the receive mode of the mobile device 1 is set to the ring mode, the ordinary call response may be made, and in case that the receive mode of the mobile device 1 is the silent mode or the vibrate mode, the call service unit 202 may put the phone off-hook by connecting the incoming call to provide the automatic call response service as described below.

In an embodiment, after the call service unit 202 connects the incoming call, the call service unit 202 may transmit a message for guidance of the automatic call response service to the caller terminal 3 (S106). The guidance message includes a Uniform Resource Locator (URL) for connection of the caller terminal 3 to the external server 2, and when the caller terminal 3 connects to the corresponding URL, guidance through display (i.e., a so-called visual ARS) may be provided instead of or in parallel with voice guidance through call connection. The guidance message may be provided in the form of push notification through the software application pre-installed in the caller terminal 3, or may be provided in the form of a text message transmitted to the telephone number of the caller terminal 3.

Figure 3:
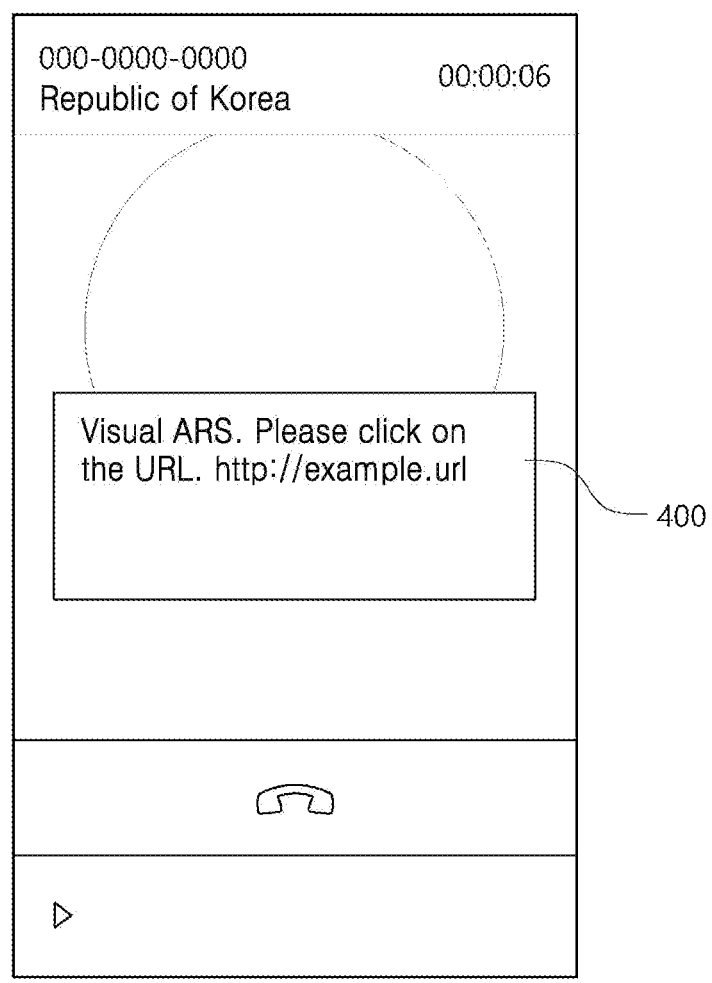
FIG. 3 is a conceptual diagram showing an embodiment of displaying information on a caller terminal by an automatic call response method of a mobile device according to an embodiment.

FIG. 3 is a conceptual diagram showing an embodiment of displaying information on the caller terminal by the automatic call response method of the mobile device according to an embodiment.

Referring to FIG. 3, the guidance message 400 "Visual ARS. Please click on the URL. http://example.url" may be transmitted to the screen of the caller terminal 3 having called the mobile device 1. The guidance message 400 may be transmitted in the form of push notification through the application or a text message, and the caller who called the telephone number of the mobile device 1 may see the guidance message 400 in the form of a banner, a pop-up or any other forms.

When the caller clicks on the URL included in the guidance message 400, guidance information may be provided to the caller terminal 3 by the external server 2 upon connection of the caller terminal 3 to the external server 2 via the corresponding URL. Meanwhile, in case that it is necessary to pre-install the predetermined application in the caller terminal 3 to provide the guidance information through the external server 2, the guidance message transmitted to the caller terminal 3 may include a URL to a linked installation page of the corresponding application. When the guidance information is provided through the external server 2, the mobile device 1 may not involve in the transmission of the guidance information.

Referring back to FIGS. 1 and 2, after the call service unit 202 of the mobile device 1 automatically connects the incoming call, the call service unit 202 may request the execution of the preset function of the mobile device 1 through the interworking module 30. In this instance, the preset function refers to an arbitrary function necessary to implement or assist the automatic call response service by the mobile device 1. In the following specification, the preset function is described by taking as an example an audio play function to induce or guide the caller to use the visual ARS via connection to the external server 2, but the function that can be performed through the automatic response is not limited thereto.

The call service unit 202 requests appropriate audio playing for the automatic response state to the interworking module 30, and the interworking module 30 requests audio control to the call module 401 of the OS 40 (S107) to play the audio appropriately for the automatic response state. The audio being played by the mobile device 1 may be transmitted to the caller who uses the caller terminal 3 via call connection, and the caller may use the visual ARS by connecting to the URL according to the guidance content of the audio heard through the call and/or the content of the guidance message transmitted to the caller terminal 3.

Accordingly, using the mobile device 1 according to embodiments, the user who uses the mobile device 1 can provide the automatic call response service through the mobile device 1 by installing the necessary application in his/her own smartphone and storing the voice guidance file without needing to build an expensive ARS system.

In an embodiment, when the audio is played by the request from the call service unit 202, the interworking module 30 may also perform the control function on the speaker 70 and/or the microphone 80 of the mobile device 1. This may be performed in a manner in which the interworking module 30 transmits the related request to the input module 403 that controls the microphone 80 and/or the output module 404 that controls the speaker 70 by the OS 40 of the mobile device 1.

For example, when the audio for the automatic response is played, in the ordinary operation, the interworking module 30 may transmit the sound of the audio being played to the caller as an input to the microphone 80 by transmitting output data through the speaker 70 to the microphone 80 as input data to the microphone 80. Additionally, in this instance, the interworking module 30 does not transmit the output to the speaker 70 to prevent the sound in the call during the automatic response from disturbing the user of the mobile device 1. Additionally, when the audio is being played, the interworking module 30 may cancel noise to prevent the microphone 80 from accepting outside noise, in order to allow the caller to hear only the audio sound while keeping the caller from hearing noise outside the mobile device 1.

In an embodiment, in case that the call coming in the mobile device 1 is a video call, the interworking module 30 may deactivate the speaker 70 and the microphone 80 of the mobile device 1 as well as a camera (not shown) of the mobile device 1 to prevent unintended image transmission to the caller.

In an embodiment, providing visual information to the caller terminal 3 through the external server 2 and transmitting auditory information to the caller terminal 3 by the mobile device 1 may be carried out in a synchronized manner. For example, when the caller terminal 3 connects to the external server 2 via the URL provided in the guidance message, information that identifies whether the caller terminal 3 is connected or not and the web page being currently displayed on the caller terminal 3 may be provided from the external server 2 to the mobile device 1, and the call service unit 202 and the interworking module 30 of the mobile device 1 may request the OS 40 to play the audio corresponding to the web page that the caller is currently seeing.

According to this embodiment, since the voice guidance synchronized with the page or menu that the user is seeing via the visual ARS may be provided via call connection, it is possible to provide the caller with the voice ARS and the visual ARS in a synchronized manner.

In an embodiment, even in case that the automatic call response service is previously set in the mobile device 1, when a call is coming in the mobile device 1, the user who uses the mobile device 1 may stop the automatic response and select to receive the call in person as usual.

Figure 4:
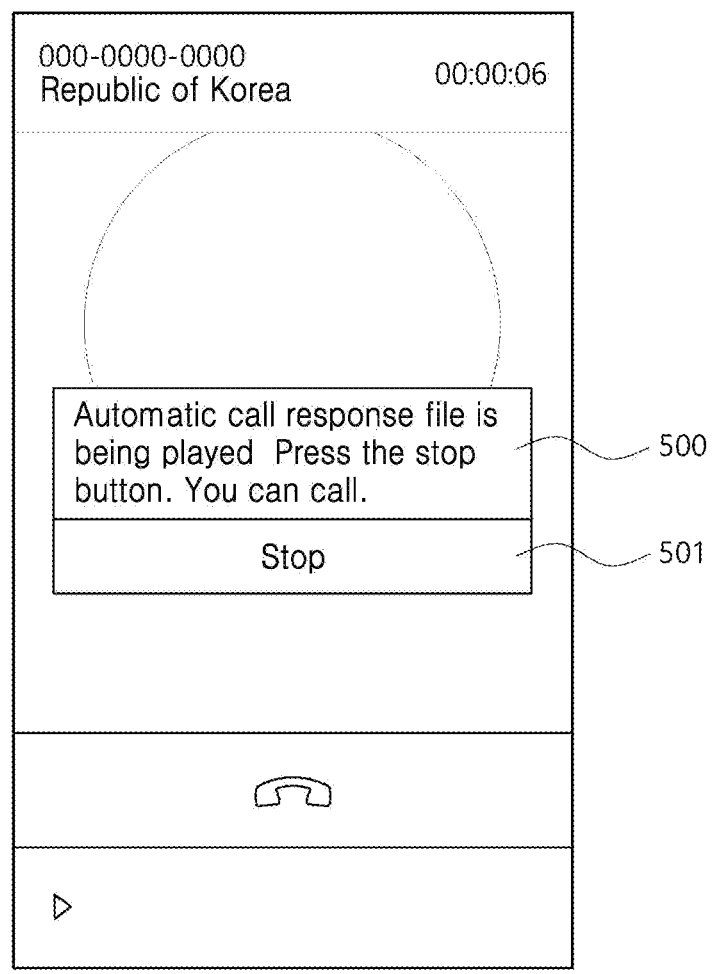
FIG. 4 is a conceptual diagram of an exemplary user interface on which a mobile device according to an embodiment receives a user input for stop of an automatic call response service.

FIG. 4 is a conceptual diagram of an exemplary user interface on which the mobile device according to an embodiment receives a user input for stop of the automatic call response service.

Referring to FIG. 4, the mobile device that provides the automatic call response service displays the guidance message 500 that the automatic response to the incoming call is currently being provided, as well as a user interface element 501 (for example, a button) used for the user to select the stop of the automatic response. When the user selects the stop of the automatic response using the interface element 501 (S108), on the contrary to the control process in the audio play step S107, the audio playing for the automatic call response service through the mobile device may be stopped and the speaker and the microphone of the mobile device may be turned on to make the ordinary call (S109).

Referring back to FIGS. 1 and 2, in an embodiment, the call service unit 202 of the service module 20 may disconnect the call connection in response to the completion of the audio playing for guidance of the automatic call response service (S110). In case that the call connection has not been disconnected but the caller terminal 3 uses the visual ARS by connecting to the external server 2, the call connection between the caller terminal 3 and the mobile device 1 is maintained, so when another caller calls the number of the mobile device 1, the mobile device 1 is busy and fails to provide the service. To prevent this problem, in this embodiment, the call service unit 202 may play the guidance audio at minimum, and when the audio playing is completed, disconnect the call connection to change the state of the mobile device 1 to allow the mobile device 1 to receive another incoming call.

In another embodiment, the disconnection of the call connection by the call service unit 202 may be made after the connection to the caller terminal 3 is detected from the external server 2 that provides the visual ARS to the caller terminal 3. When the caller terminal 3 connects to the external server 2 via the URL or voice guidance transmitted from the mobile device 1, the external server 2 may transmit information that identifies the connection fact of the caller terminal 3 to the mobile device 1 in the form of a URL or a text message. The service module 20 of the mobile device 1 may identify the URL or the text message received by the mobile device 1 from the OS of the mobile device 1 through the interworking module 30, and when the URL or the text message contains the preset content that identifies the connection fact of the caller terminal 3 to the external server 2, may disconnect the call connection to the caller terminal 3 in response.

Additionally, in an embodiment, the log service unit 203 of the service module 20 may store response logs after the response through the automatic call response service is made (S111). The response logs may include information, for example, the calling number, the connection time and/or the call duration of the incoming call connected by the call service unit 202. The response logs may be stored in the local storage of the mobile device 1 or may be stored in the external server 2 via communication between the mobile device 1 and the external server 2. Further, in an embodiment, the response logs may be used to provide a personalized service to the caller by managing the callers usage history for the automatic call response service as described in the following embodiment.

Figure 5:
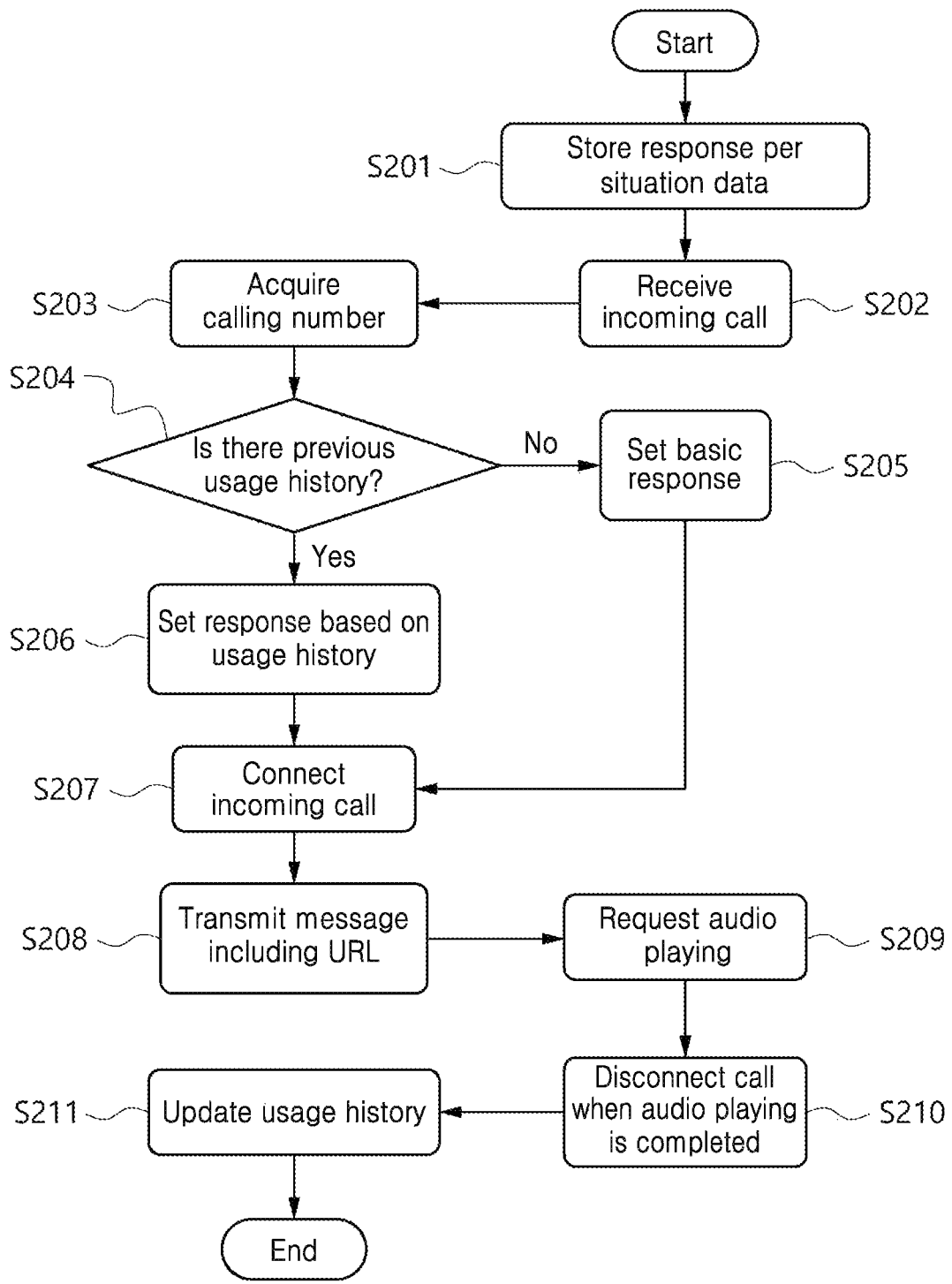
FIG. 5 is a flowchart showing each step of a process of providing a personalized service to a caller by an automatic call response method of a mobile device according to an embodiment.

FIG. 5 is a flowchart showing each step of a process of providing the personalized service to the caller by the automatic call response method of the mobile device according to an embodiment. For convenience of description, the automatic call response method of the mobile device according to this embodiment will be described with reference to FIGS. 1 and 5.

In this embodiment, response per situation data may be stored in the mobile device 1 (S201). The response per situation data includes the classified response content according to the presence or absence of the caller's previous usage history and/or the content of the previous usage history to provide the personalized service to the caller. For example, the response per situation data may separately include the guidance message to be transmitted to the caller having no previous usage history and the guidance message to be transmitted to the caller having the previous usage history. Additionally, the response per situation data may separately include the audio to be played for the caller having no previous usage history and the audio to be played for the caller having the previous usage history. Further, the guidance message and/or the guidance audio provided to the caller having the previous usage history may be sub-classified according to the further detailed content (for example, the number of calls, the call receipt time, the call duration, etc.) of the usage history.

In an embodiment, the response per situation data may be pre-stored in the mobile device 1, or may be transmitted from the external server 2 to the mobile device 1 by the communication method via the network. The mobile device 1 may receive and store the response per situation data from the external server 2 at the time when the automatic call response service is executed. Alternatively, the mobile device 1 may receive and store the response per situation data from the external server 2 in response to an occurrence of a situation in which the corresponding data is not pre-stored. For example, when a call is coming from the caller having the previous usage history for the first time, the mobile device 1 may receive and store the content of the guidance message to be transmitted to the caller having the previous usage history or the audio to be played for the caller having the previous usage history from the external server 2.

Subsequently, when the incoming call is received on the mobile device 1 (S202), the transaction service unit 201 may acquire the calling number corresponding to the caller terminal 3 from the information of the incoming call (S203). Subsequently, the call service unit 202 may detect whether there is the previous usage history for the corresponding calling number by searching for the corresponding calling number in the usage history database stored in the mobile device 1 or the external server 2 (S204).

In this embodiment, the call service unit 202 may set response data to be provided to the caller terminal 3 having the corresponding calling number according to the previous usage history (S205, S206). That is, the call service unit 202 may set to provide a basic response to the caller having no previous usage history (S205) and a usage history-based response to the caller having the previous usage history (S206). In the specification, the response data provided to the caller having no previous usage history is referred to as the basic response, but this is provided to identify the type of response for illustrative purposes only and is not intended to limit the format or content of response.

When the response is determined, the call service unit 202 may connect the incoming call to provide the automatic call response service (S207), and provide the automatic call response service by transmitting the guidance message including the URL (S208) and/or playing the guidance audio through the mobile device 1 (S209). In this instance, the content of the guidance message transmitted to the caller terminal 3 and/or the content of the audio played for the caller through the mobile device 1 may be different depending on the type of response set in the above-described steps S205, S206.

For example, the guidance message including the URL for installation of the visual ARS application may be transmitted to the caller having no previous usage history, and the guidance message of the content about welcome for re-visiting, free of the corresponding URL, may be transmitted to the caller having the previous usage history. Additionally, the audio including the application installation guidance may be played for the caller having no previous usage history through the call, and the audio of a simpler type except the corresponding guidance may be played for the caller having the previous usage history.

In an embodiment, the content of the response to be provided based on the usage history may be determined in a manner in which the mobile device 1 searches the external server 2. For example, the external server 2 is a server related to services (or products) provided by the user who uses the mobile device 1, and the external server 2 may store and manage the details related to the services provided by the user of the mobile device 1, for example, customers' subscription information, service usage history of each customer and payment history of each customer.

In this case, the mobile device 1 may receive necessary information, for example, the service subscription information, the service usage history and the payment history of the customer corresponding to the corresponding calling number by searching the external server 2 using the calling number acquired from the incoming call, and determine the type of guidance message to be transmitted to the corresponding customer or audio to be played for the corresponding customer based on the information.

For example, when the caller using the services provided by the user of the mobile device 1 calls the mobile device 1, a URL address that provides the personalized ARS menu according to the services to which the corresponding caller subscribed may be transmitted to the caller, or a URL address for nudge marketing that suggests menus or services in which the corresponding caller may get interested may be transmitted to the caller.

Alternatively, the guidance message or the guidance voice created using personal information, for example, the corresponding caller's name, may be provided to the caller. In this case, the conversion of the caller's personal information to audio may be performed by the mobile device 1 or the external server 2 using Text-To-Speech (TTS) technology, and the mobile device 1 may provide the personalized automatic call response service to the caller by playing the audio converted by TTS technology.

In an embodiment, the call service unit 202 of the service module 20 may disconnect the call connection in response to the completion of the audio playing for guidance of the automatic call response service (S210). Additionally, in an embodiment, the log service unit 203 of the service module 20 may update the usage history of the caller after the response to the corresponding caller is made (S211). This includes a process of storing the information of the corresponding caller, for example, the call connection time and/or the call duration in the mobile device 1 and/or the external server 2 as the usage history related to the corresponding caller, and is used to determine the personalized response when the same caller makes a call again.

The operation by the automatic call response method of the mobile device according to embodiments as described above may be implemented, at least in part, in a computer program and recorded on a computer-readable recording medium. The computer-readable recording medium that stores the program for performing the operation by the automatic call response method of the mobile device according to embodiments includes any type of recording device in which computer-readable data is stored. Examples of the computer-readable recording medium include ROM, RAM, CD-ROM, magnetic tape, floppy disk and an optical data storage device. Additionally, the computer-readable recording medium is distributed over computer systems connected via a network, and may store and execute a computer-readable code in a distributed manner. Additionally, a functional program, code and code segment for realizing this embodiment will be easily understood by persons having ordinary skill in the technical field to which this embodiment belongs.

While the present disclosure has been hereinabove described with reference to the embodiments shown in the drawings, this is provided for illustrative purposes only and it will be appreciated by those having ordinary skill in the art that a variety of modifications and variations may be made thereto. However, it should be noted that such modifications fall within the technical protection scope of the present disclosure. Therefore, the true technical protection scope of the present disclosure should be defined by the technical spirit of the appended claims.

INDUSTRIAL APPLICABILITY

In accordance with the mobile device according to an aspect of the present disclosure and its automatic call response method, according to the automatic call response service set in the mobile device, the mobile device automatically receives the incoming call without the user's intervention and provides the automatic call response service to the caller by playing the preset audio and/or transmitting the connection information via the Uniform Resource Locator (URL), and thus it is industrially applicable.

The invention claimed is:

1. A mobile device, comprising:
a processor;
a call circuit configured to operate by control of the processor and configured to receive an incoming call;
a service circuit configured to operates by control of the processor and configured to automatically connect the incoming call when an automatic call response service is set in the mobile device; and
an interworking circuit configured to operate by control of the processor and configured to perform a preset function of the mobile device in response to a request from the service circuit after the incoming call is connected by the service circuit,
wherein the service circuit is further configured to transmit an audio control command to the interworking circuit in response to the connection of the incoming call, and
wherein the interworking circuit is further configured to stop an operation of a speaker and a microphone of the mobile device and transmit an audio control request for control of audio playing by the mobile device to the call circuit in response to the audio control command.

2. The mobile device according to claim 1, wherein the service circuit includes:
a transaction service circuit configured to store information about whether the automatic call response service is set and transmit information corresponding to the incoming call; and
a call service circuit configured to selectively connect the incoming call based on the information about whether the automatic call response service is set.

3. The mobile device according to claim 2, wherein the service circuit further includes a log service circuit configured to store information about at least one of a calling number, a connection time or a call duration of the incoming call connected by the call service circuit.

4. The mobile device according to claim 1, wherein the service circuit is further configured to disconnect the connection of the incoming call in response of the call circuit terminating the audio playing based on the audio control command.

5. The mobile device according to claim 1, wherein the service circuit is further configured to transmit a guidance message including a Uniform Resource Locator (URL) to a caller terminal of the incoming call via push notification through an application or a text message after the incoming call is connected.

6. The mobile device according to claim 1, further comprising:
an input circuit configured to operate by control of the processor and configured to receive a user input about whether to execute the automatic call response service,
wherein the interworking circuit is further configured to stop the execution of the preset function in response to the input circuit receiving a user input for stop of the automatic call response service.

7. An automatic call response method of a mobile device, performed by the mobile device including a processor, a call circuit, a service circuit and an interworking circuit, the method comprising:
receiving, by the call circuit, an incoming call;
automatically connecting, by the service circuit, the received incoming call when an automatic call response service is set in the mobile device;
transmitting, by the service circuit, a request for execution of a preset function of the mobile device to the interworking circuit after the incoming call is connected; and
performing, by the interworking circuit, the preset function on the mobile device in response to the request from the service circuit,
wherein the request for the execution of the preset function includes an audio control command, and
wherein performing, by the interworking circuit, the preset function on the mobile device comprises:
stopping, by the interworking circuit, an operation of a speaker and a microphone of the mobile device in response to the audio control command; and
transmitting, by the interworking circuit, an audio control request for control of audio playing by the mobile device to the call circuit in response to the audio control command.

8. The automatic call response method of the mobile device according to claim 7, wherein the service circuit is configured to store information about whether the automatic call response service is set in the mobile device, and
wherein the method further comprises, before automatically connecting the incoming call:
inspecting, by the service circuit, whether the automatic call response service is set in the mobile device.

9. The automatic call response method of the mobile device according to claim 7, further comprising, after automatically connecting the incoming call:
storing, by the service circuit, information about at least one of a calling number, a connection time or a call duration of the incoming call.

10. The automatic call response method of the mobile device according to claim 7, further comprising:
disconnecting, by the service circuit, the connection of the incoming call in response to the call circuit terminating the audio playing based on the audio control command.

11. The automatic call response method of the mobile device according to claim 7, further comprising:
transmitting, by the service circuit, a guidance message including a Uniform Resource Locator (URL) to a caller terminal of the incoming call via push notification through an application or a text message after the incoming call is connected.

12. The automatic call response method of the mobile device according to claim 7, further comprising:
receiving a user input for stop of the automatic call response service through an input circuit of the mobile device; and
stopping, by the interworking circuit, the execution of the preset function in response to the input circuit receiving the user input for the stop of the automatic call response service.

13. A non-transitory computer-readable recording medium having stored therein a program to perform the automatic call response method of the mobile device according to claim 7.

* * * * *